(12) United States Patent  
Yamanaka et al.

(10) Patent No.: US 7,339,876 B2  
(45) Date of Patent: Mar. 4, 2008

(54) OPTICAL SYSTEM OF OPTICAL PICK-UP

(75) Inventors: Kenzo Yamanaka, Saitama-ken (JP); Koichi Maruyama, Tokyo (JP); Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 608 days.

(21) Appl. No.: 10/829,279

(22) Filed: Apr. 22, 2004

(65) Prior Publication Data

US 2004/0213132 A1  Oct. 28, 2004

(30) Foreign Application Priority Data

Apr. 25, 2003  (JP) ............................. 2003-122035

(51) Int. Cl.  
  *G11B 7/00*  (2006.01)
(52) U.S. Cl. ............................. 369/112.01; 369/53.19
(58) Field of Classification Search ...................... None  
  See application file for complete search history.

(56) References Cited

U.S. PATENT DOCUMENTS

| 5,665,957 | A |  | 9/1997 | Lee et al. |
| 6,009,066 | A |  | 12/1999 | Yoo et al. |
| 6,043,912 | A |  | 3/2000 | Yoo et al. |
| 6,111,842 | A | * | 8/2000 | Nishino et al. ............. 369/118 |
| 6,118,594 | A |  | 9/2000 | Maruyama |
| 6,222,812 | B1 |  | 4/2001 | Yoo et al. |
| 6,363,046 | B1 | * | 3/2002 | Yoo et al. ............... 369/112.23 |
| 7,116,627 | B2 |  | 10/2006 | Yoo et al. |
| 2002/0172132 | A1 |  | 11/2002 | Takeuchi et al. |
| 2003/0058776 | A1 | * | 3/2003 | Sakamoto .............. 369/112.07 |
| 2003/0202450 | A1 | * | 10/2003 | Takasuka et al. ...... 369/112.07 |

FOREIGN PATENT DOCUMENTS

| CN | 1264899 | 8/2000 |
| CN | 1335600 | 2/2002 |

(Continued)

OTHER PUBLICATIONS

English language Abstract and computer-generated translation of JP 2000-207766.

*Primary Examiner*—Wayne Young  
*Assistant Examiner*—Lixi Chow  
(74) *Attorney, Agent, or Firm*—Greenblum & Bernstein, P.L.C.

(57) ABSTRACT

There is provided an optical system of an optical pick-up for recording/reproducing data to/from at least two types of optical discs including a first optical disc and a second optical disc whose recording density is higher than that of the first optical disc. The optical system is provided with a light source unit for the first and second optical discs, an objective lens, and a photo detector. The optical system further includes an optical surface to satisfy compatibility between the at least two types of optical discs, the optical surface being located between the light source unit and one of the at least two type of optical discs. The optical surface has an inner region having a numerical aperture for the first optical disc, an outer region located having a numerical aperture for the second optical disc, and an intermediate region that is located within the outer region at a periphery of the inner region. Transmissivity for a light beam having a wavelength suitable for the first optical disc in the intermediate region is lower than that in the inner region.

25 Claims, 4 Drawing Sheets

FOREIGN PATENT DOCUMENTS

| | | |
|---|---|---|
| JP | 2000-76694 | 3/2000 |
| JP | 2000-81566 | 3/2000 |
| JP | 2000-207766 | 7/2000 |
| JP | 2002-333576 | 11/2002 |

* cited by examiner

OPTICAL SYSTEM OF OPTICAL PICK-UP

BACKGROUND OF THE INVENTION

The present invention relates to an optical system of an optical pick-up employed in an optical disc device which is used for recording data to and/or reproducing data from a plurality of types of optical discs having different thicknesses of cover layers.

Various types of optical discs on which digital information is recorded at various densities and which have different thicknesses of cover layers have been widely used. For example, a DVD (digital versatile disc) has a recording density higher than that of a CD (compact disc) or a CD-R (CD Recordable) and has a cover layer thinner than that of the CD or CD-R.

In the optical system of optical pick-up, the amount of spherical aberration changes depending on the thickness of a cover layer of the optical disc being used. Therefore, when the optical disc is changed to another having different thickness of cover layer and different recording density, a numerical aperture (NA) of light used for recording/reproducing has to be changed in response to the difference of the recording density while the spherical aberration caused by the difference of the thickness of cover layer has to be corrected.

For example, for the optical disc having relatively high recording density, high NA is required so that a diameter of a beam spot is reduced. The diameter of the beam spot decreases as wavelength of light decreases. Therefore, in general, wavelength of 780~830 nm is used for the CD, and wavelength of 635~665 nm is used for the DVD. To support the CD and the DVD, recent optical disc devices employ a light source unit which can emit laser beams having different wavelengths.

Japanese Patent Provisional Publication No. 2000-81566 discloses a CD/DVD compatible objective lens (i.e., an objective lens of an optical pick-up that can be used for both of the DVD and CD). The CD/DVD compatible objective lens has a diffracting structure on one of its lens surfaces. The diffracting structure has a plurality of concentric annular steps having a function of properly converging an incident beam on a data recording layer of an optical disc regardless of the thickness of a cover layer of the optical disc.

That is, the diffracting structure has wavelength dependence such that the spherical aberration changes depending on the wavelength of an incident beam. Consequently, the CD/DVD compatible objective lens is capable of supporting various types of optical discs having different thicknesses of the cover layers.

More specifically, the lens surface having the diffracting lens structure is divided into an inner region including an optical axis thereof and an outer region located outside the inner region. The diffracting structure formed within the inner region has a function of appropriately converging the beam with wavelength for the CD on the data recording layer of the CD and has a function of appropriately converging the beam with wavelength for the DVD on the data recording layer of the DVD.

The diffracting structure formed within the outer region appropriately converges the beam with wavelength for the DVD on the data recording layer of the DVD while diffusing the beam with wavelength for the CD as flare light so that the diameter of the beam spot is not reduced excessively on the data recording layer of the CD.

With the above mentioned configuration, only the beam passing through the inner region is converged on the data recording layer when the CD is used, and therefore the beam spot having relatively large diameter is formed on the data recording layer of the CD.

On the other hand, when the DVD is used, the beam passing through both of the inner region and the outer region is converged on the data recording layer of the DVD, which increases the NA. Therefore, the beam spot having reduced diameter is formed on the data recording layer of the DVD.

When the flare light, which is reflected from the data recording layer when the CD is used, is detected by a signal detecting unit provided in the optical disc device, noise may be caused on servo signals such as FE (Focus Error) signal and a TE (Tracking Error) signal.

Japanese Patent Provisional Publication No. 2002-333576 discloses an objective lens having lens surface on which a diffracting structure is formed. The lens surface is divided into an inner region and an outer region. The diffracting structure disclosed in 2002-333576 is configured such that the light incident on the outer region is diffracted into a plurality of diffraction orders of light.

With this structure, the light for the CD incident on the outer region is diffused into a wide area on the data recording layer of the CD, which reduces intensity of the flare light on the data recording layer of the CD. Therefore, the level of noise introduced on the servo signals can be reduced.

However, the advantage that the light for the CD is diffracted into a plurality of diffraction orders of light is attained only when the CD is positioned at a proper position in which a surface of the CD is perpendicular to an optical axis of the objective lens. If the CD is tilted from the proper position, the light, which is reflected from the CD and has high intensity, may be incident on the outer region.

Assuming that a tilt angle of the CD with respect to the proper position is significantly small (e.g., smaller than 1°), only a portion of the high intensity light reflected from the CD is incident on the outer region. That is, a small portion of high intensity light reflected from the CD is incident on a portion within the outer region adjacent to the inner region.

If such a phenomenon occurs, the high intensity light incident on the portion within the outer region adjacent to the inner region is hardly diffracted by the diffracting structure on the lens surface because the number of diffractive ring-shaped zones in the portion within the outer region adjacent to the inner region, on which the high intensity light is incident, is relatively small. Consequently, the high intensity light passing through the portion within the outer region adjacent to the inner region is incident on a light receiving portion of the signal detecting unit as undesired light.

The undesired light incident on the light receiving portion in the signal detecting unit causes noise on the TE signal or the FE signal, in particular, on the TE signal generated on the basis of the three-beam method.

SUMMARY OF THE INVENTION

The present invention is advantageous in that it provides an optical system of optical pick-up that is capable of suppressing effectively undesired light caused when an optical disc is tilted with respect a proper position.

According to an aspect of the invention, there is provided an optical system of an optical pick-up for recording data to and/or reproducing data from at least two types of optical discs including a first optical disc and a second optical disc whose recording density is higher than that of the first optical disc. The optical system is provided with a light source unit that is capable of emitting at least two light beams having different wavelengths respectively corresponding to the first and second optical discs, an objective lens that is used for respectively converging the at least two light beams on data recording surfaces of the at least two types of optical discs, and a photo detector that has a main sensor for receiving a main beam of returning light from a disc side, and sub-sensors for receiving sub-beams of the returning light from the disc side.

In this structure, the optical system further includes an optical surface to satisfy compatibility between the at least two types of optical discs, the optical surface being located between the light source unit and one of the at least two type of optical discs. The optical surface has an inner region including an optical axis of the objective lens and satisfying a numerical aperture for the first optical disc, an outer region located outside the inner region for satisfying a numerical aperture for the second optical disc, and an intermediate region that is located within the outer region at a periphery of the inner region.

Further, transmissivity for a light beam having a wavelength suitable for the first optical disc in the intermediate region is lower than that in the inner region.

With this configuration of the optical system, occurrence of undesired light caused when the first optical disc is tilted with respect a proper position is effectively suppressed. Consequently, a noise level on a TE signal caused when the first optical disc is used can be sufficiently suppressed.

In a particular case, when the first optical disc is tilted by a certain minute angle with respect to a plane perpendicular to the optical axis of the objective lens during reproducing operation of the first optical disc, intensity of a portion of the returning light passed through the intermediate region is reduced on the sub-sensors of the photo detector so that the portion of the returning light does not interfere with photo detection operation of the sub-sensors.

Optionally, transmissivity for a light beam having a wavelength suitable for one of the at least two types of optical discs other than the first optical disc in the intermediate region may be substantially the same as that of the inner region and the outer region. Further, when the one of the at least two types of optical discs other than the first optical disc is used, the light beam for the one of the at least two types of optical discs other than the first optical disc passed through all of the inner region, the intermediate region and the outer region may be utilized.

Still optionally, the transmissivity for the light beam having the wavelength suitable for the first optical disc in the intermediate region may be about half of or less than half of transmissivity for the light beam having the wavelength suitable for the first optical disc in the inner region.

According to another aspect of the invention, there is provided an optical system of an optical pick-up for recording data to and/or reproducing data from at least two types of optical discs including a first optical disc and a second optical disc whose recording density is higher than that of the first optical disc. The optical system is provided with a light source unit that is capable of emitting at least two light beams having different wavelengths respectively corresponding to the first and second optical discs, an objective lens that is used for respectively converging the at least two light beams on data recording surfaces of the at least two types of optical discs, and a photo detector that has a main sensor for receiving a main beam of retuning light from a disc side, and sub-sensors for receiving sub-beams of the retuning light from the disc side.

In this structure, the optical system further includes an optical surface to satisfy compatibility between the at least two types of optical discs, the optical surface being located between the light source unit and one of the at least two types of optical discs. The optical surface has an inner region including an optical axis of the objective lens and satisfying a numerical aperture for the first optical disc, an outer region located outside the inner region for satisfying a numerical aperture for the second optical disc, and an intermediate region that is located within the outer region at a periphery of the inner region.

Further, the intermediate region has a plurality of minute annular zones for giving optical path differences to an incident beam, an absolute value of each optical path difference generated between adjacent ones of the plurality of minute annular zones is N+0.5 times (N: natural number) as large as the wavelength of the light beam suitable for the first optical disc.

With this configuration of the optical system, occurrence of undesired light caused when the first optical disc is tilted with respect a proper position is effectively suppressed. Consequently, a noise level on a TE signal caused when the first optical disc is used can be sufficiently suppressed.

In a particular case, when the first optical disc is tilted by a certain minute angle with respect to a plane perpendicular to the optical axis of the objective lens during reproducing operation of the first optical disc, intensity of a portion of the returning light passed through the intermediate region is reduced on the sub-sensors of the photo detector so that the portion of the returning light does not interfere with photo detection operation of the sub-sensors.

In a particular case, N may be smaller than or equal to 5.

Optionally, the each optical path difference generated between adjacent ones of the plurality of minute annular zones may be an integral multiple of a wavelength of a light beam for one of the at least two types of optical discs other than the first optical disc, the integral multiple being exclusive of zero. Further, when the one of the at least two types of optical discs other than the first optical disc is used, the light beam for the one of the at least two types of optical discs other than the first optical disc passed through all of the inner region, the intermediate region and the outer region may be utilized.

Still optionally, the plurality of minute annular zones may have repetition of a pair of zones that give optical path differences whose signs are different from each other.

In a particular case, a size of each of protruded surfaces of the plurality of minute annular zones may be larger than a size of each of recessed surfaces of the plurality of minute annular zones.

Optionally, a width Wz of each of the plurality of minute annular zones may satisfy a condition $0.005 \text{ mm} \leq Wz \leq 0.020 \text{ mm}$ when the plurality of minute annular zones are projected to a plane perpendicular to a reference axis of the optical system.

Still optionally, the optical system may satisfy a condition:

$$0.0035 < \{W \cdot (\phi_2/\phi_1)\}/\{(1-M) \cdot f\} < 0.0350 \qquad (1)$$

where W (mm) represents a width of the intermediate region when the intermediate region is projected onto a plane perpendicular to a reference axis of the optical system, f (mm) represents a focal length of the objective lens for the wavelength of the light beam for the first optical disc, M represents a magnification of the objective lens when the first optical disc is used, $\phi_1$ (mm) represents a diameter of the inner region, and $\phi_2$ (mm) represents a diameter of the light beam incident on the inner region when the diameter $\phi_2$ is measured on a light source side surface of the objective lens.

In a particular case, the optical surface to satisfy the compatibility may be formed on one of surfaces of the objective lens.

In a particular case, the intermediate region may adjoin the inner region.

According to another aspect of the invention, there is provided an objective lens used for an optical system of an optical pick-up for recording data to and/or reproducing data from at least two types of optical discs including a first optical disc and a second optical disc whose recording density is higher than that of the first optical disc. One of surfaces of the objective lens has an inner region including an optical axis of the objective lens and satisfying a numerical aperture for the first optical disc, an outer region located outside the inner region for satisfying a numerical aperture for the second optical disc, and an intermediate region that is located within the outer region at a periphery of the inner region.

In this structure, transmissivity for a light beam having a wavelength suitable for the first optical disc in the intermediate region is lower than that in the inner region.

With this configuration of the objective lens, occurrence of undesired light caused when the first optical disc is tilted with respect a proper position in the optical system is effectively suppressed. Consequently, a noise level on the TE signal caused when the first optical disc is used can be sufficiently suppressed.

In a particular case, when the first optical disc is tilted by a certain minute angle with respect to a plane perpendicular to the optical axis of the objective lens during reproducing operation of the first optical disc, a portion of returning light from a disc side is incident on the intermediate region, almost all of the portion of returning light incident on the intermediate region being shielded by the intermediate region.

Optionally, transmissivity for a light beam having a wavelength suitable for one of the at least two types of optical discs other than the first optical disc in the intermediate region may be substantially the same as that of the inner region and the outer region. Further, when the one of the at least two types of optical discs other than the first optical disc is used, the light beam for the one of the at least two types of optical discs other than the first optical disc passed through all of the inner region, the intermediate region and the outer region may be utilized.

Still optionally, the transmissivity for the light beam having the wavelength suitable for the first optical disc in the intermediate region may be about half of or less than half of transmissivity for the light beam having the wavelength suitable for the first optical disc in the inner region.

According to another aspect of the invention, there is provided an objective lens used for an optical system of an optical pick-up for recording data to and/or reproducing data from at least two types of optical discs including a first optical disc and a second optical disc whose recording density is higher than that of the first optical disc. One of surfaces of the objective lens has an inner region including an optical axis of the objective lens and satisfying a numerical aperture for the first optical disc, an outer region located outside the inner region for satisfying a numerical aperture for the second optical disc, and an intermediate region that is located within the outer region at a periphery of the inner region.

In this structure, the intermediate region has a plurality of minute annular zones for giving optical path differences to an incident beam, an absolute value of each optical path difference generated between adjacent ones of the plurality of minute annular zones being N+0.5 times (N: natural number) as large as the wavelength of the light beam suitable for the first optical disc.

With this configuration of the objective lens, occurrence of undesired light caused when the first optical disc is tilted with respect a proper position in the optical system is effectively suppressed. Consequently, a noise level on the TE signal caused when the first optical disc is used can be sufficiently suppressed.

In a particular case, when the first optical disc is tilted by a certain minute angle with respect to a plane perpendicular to the optical axis of the objective lens during reproducing operation of the first optical disc, a portion of returning light from a disc side is incident on the intermediate region, the portion of returning light incident on the intermediate region being diffused by the intermediate region by a large amount.

In a particular case, N may be smaller than or equal to 5.

Optionally, the each optical path difference generated between adjacent ones of the plurality of minute annular zones may be an integral multiple of the wavelength of a light beam for one of the at least two types of optical discs other than the first optical disc, the integral multiple being exclusive of zero. Further, when the one of the at least two types of optical discs other than the first optical disc is used, the light beam for the one of the at least two types of optical discs other than the first optical disc passed through all of the inner region, the intermediate region and the outer region may be utilized.

Still optionally, the plurality of minute annular zones may have repetition of a pair of zones that give optical path differences whose signs are different from each other.

In a particular case, a size of each of protruded surfaces of the plurality of minute annular zones may be larger than a size of each of recessed surfaces of the plurality of minute annular zones.

In a particular case, a width Wz of each of the plurality of minute annular zones may satisfy $0.005 \text{ mm} \leq Wz \leq 0.020$ mm when the plurality of minute annular zones are projected to a plane perpendicular to the optical axis of the objective lens.

Optionally, the objective lens may satisfy a condition:

$$0.0035 < W/\{(1-M) \cdot f\} < 0.0350 \quad (2)$$

where W (mm) represents a width of the intermediate region when the intermediate region is projected onto a plane perpendicular to the optical axis the objective lens, f (mm) represents a focal length of the objective lens for the wavelength of the light beam for the first optical disc, and M represents a magnification of the objective lens when the first optical disc is used.

In a particular case, the intermediate region may adjoin the inner region.

DETAILED DESCRIPTION OF THE EMBODIMENTS

Hereinafter, embodiments according to the invention are described with reference to the accompanying drawings.

Figure 1:
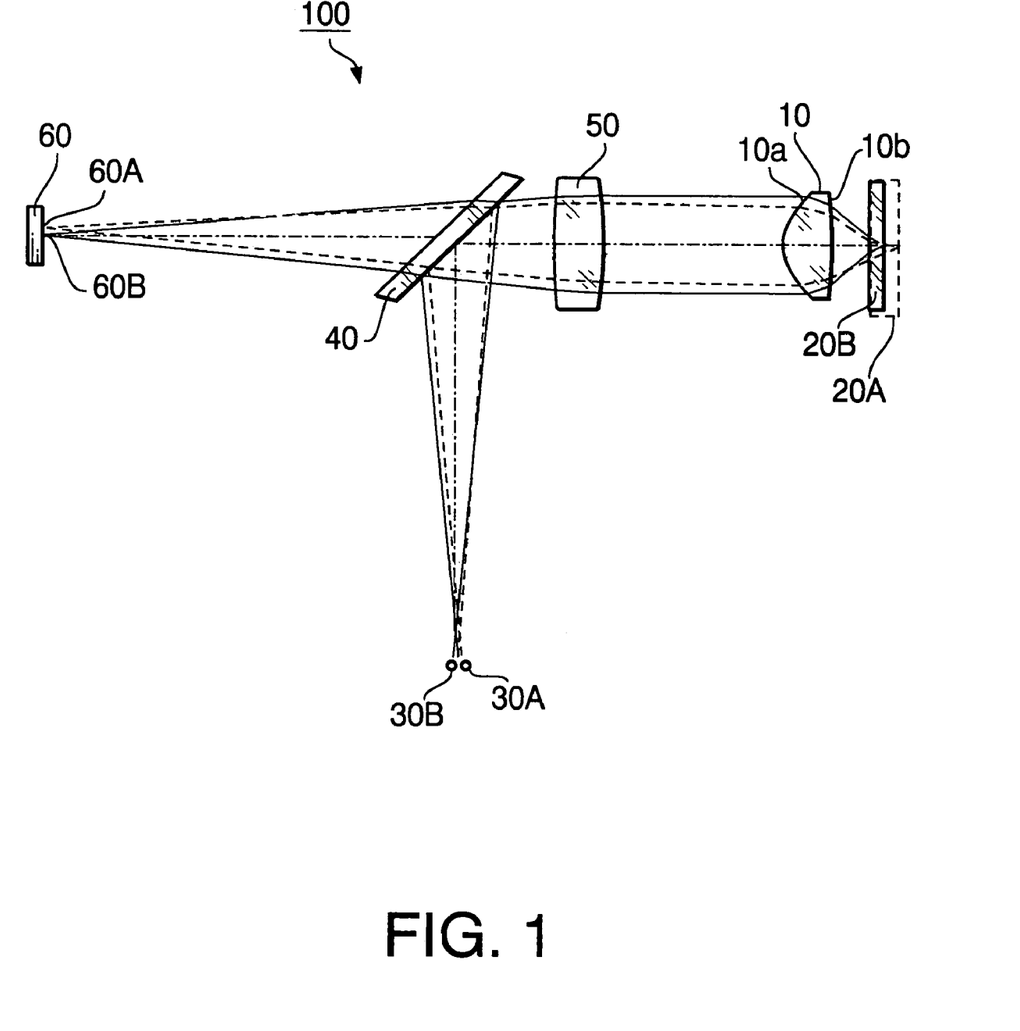
FIG. 1 shows a block diagram of an optical system of an optical pick-up according to an embodiment of the invention.

FIG. 1 shows a block diagram of an optical system 100 of an optical pick-up according to an embodiment of the invention. The optical system 100 supports at least two types of optical discs 20A and 20B. That is, the optical system 100 can record data to and/or reproduce data from a plurality of types of optical discs 20A and 20B.

The disc 20A has a relatively thick cover layer and has a relatively low recording density. For example, the disc 20A is a CD or a CD-R. The disc 20B has a relatively thin cover layer and has a relatively high recording density. For example, the disc 20B is a DVD.

As shown in FIG. 1, the optical system 100 includes light sources 30A and 30B, a half mirror 40, a collimator lens 50, an objective lens 10 and a light detecting unit 60. The disc 20A (or 20B) is placed on a turn table (not shown) and is rotated by a driving mechanism (not shown).

In FIG. 1, a reference axis of the optical system 100 is indicated by a chain line. Although in FIG. 1 a situation in which the reference axis coincides with an optical axis of the optical system 100 is indicated, there is another situation in which the optical axis of the optical system 100 shifts from the reference axis of the optical system 100 due to tracking operation.

When the disc 20A (e.g., CD) is used, laser light having relatively long wavelength is emitted from the light source 30A so that a beam spot having a relatively large diameter is formed on a data recording layer of the optical disc 20A. When the disc 20B (e.g., DVD) is used, laser light having relatively short wavelength (shorter than the wavelength of the light used for the disc 20A) is emitted from the light source 30B so that a beam spot having a relatively small diameter is formed on a data recording layer of the optical disc 20B.

Hereafter, recording and reproducing operation of the optical system 100 when the optical disc 20A (20B) is positioned at an appropriate position, i.e., when the optical disc is not tilted with respect to the proper position will be described. A laser beam emitted by the light source 30A or 30B is deflected by the half mirror 40 and is incident on the collimator lens 50 which collimates the incident laser beam.

Then, the laser beam collimated by the collimator lens 50 is incident on the objective lens 10 which forms a beam spot on the data recording layer of the optical disc 20A (20B). In FIG. 1, the laser beam emitted from the light source 30A is indicated by dashed lines, and the laser beam emitted from the light source 30B is indicated by solid lines.

The objective lens 10 has a first surface 10a located on a light source side and a second surface 10b located on an optical disc side. The first surface 10a and the second surface 10b are aspherical surfaces. The objective lens 10a is a biconvex single element lens made of plastic.

As described above, the optical discs 20A and 20B have different thicknesses of cover layers. Therefore, when the optical disc is changed to the other optical disc, the amount of spherical aberration changes. To correct spherical aberration caused by the difference of the thickness of the cover layer, the objective lens 10 is configured to have a diffracting structure on at least one of the first and second surfaces.

In this embodiment, the diffracting structure is formed on the first surface 10a. The diffracting structure has a plurality of annular steps concentrically arranged about the optical axis of the objective lens 10.

Figure 2:
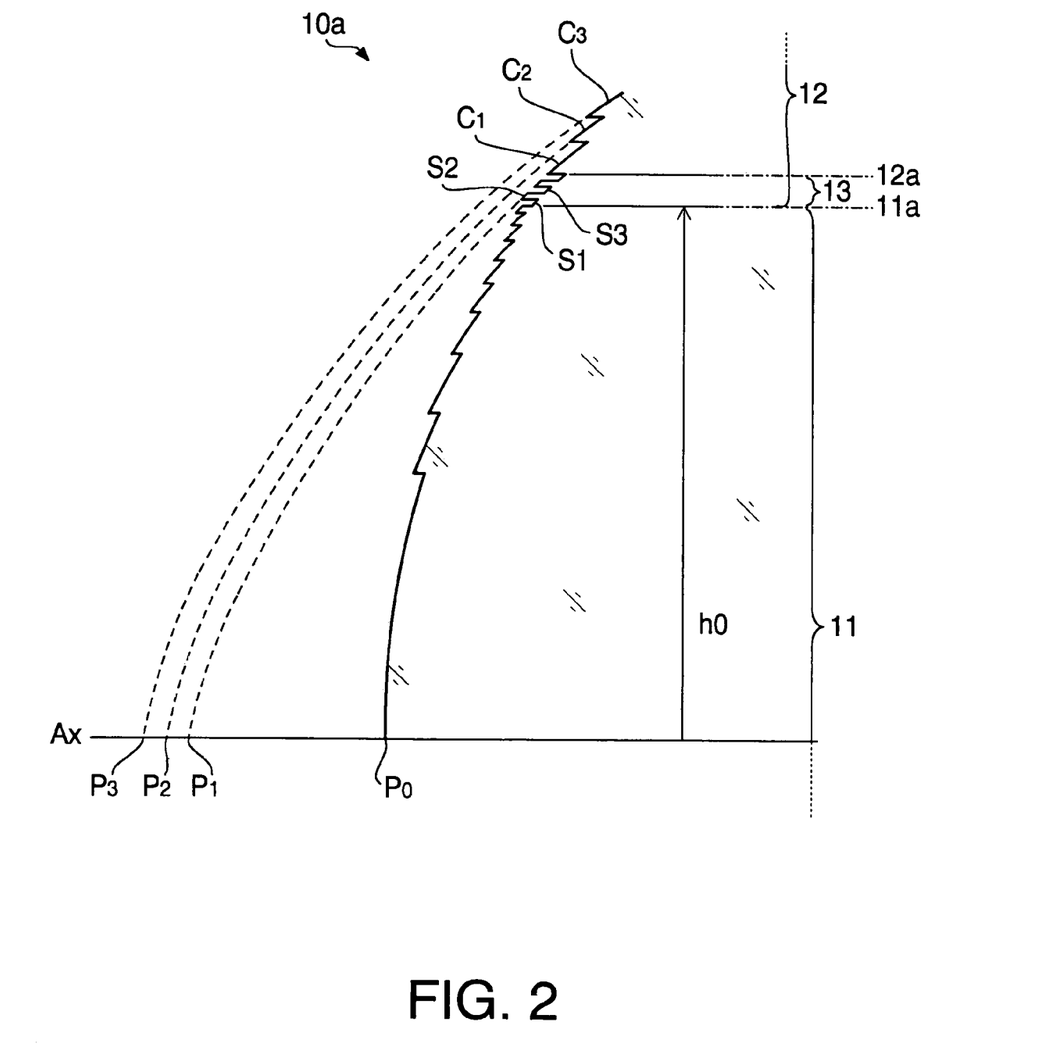
FIG. 2 shows a cross sectional view of an objective lens provided in the optical system when the objective lens is cut by a plane including its optical axis.

FIG. 2 shows a cross sectional view of the objective lens 10 when the objective lens is cut by a plane including the optical axis. As shown in FIG. 2, the first surface 10a of the objective lens 10 is divided into an inner region 11 including the optical axis (Ax) and an outer region 12 located outside the inner region 11.

An intermediate region 13 is formed within the outer region 12 at a periphery of the inner region 11. Each of the inner region 11, the intermediate region 13 and the outer region 12 has the plurality of annular steps. As shown in FIG. 2, at each step, the outer zone protrudes from the inner zone.

The inner region 11 has a numerical aperture (NA) sufficient for the recordation and the reproduction of the optical disc 20A, and the diffracting structure formed within the inner region 11 is blazed at a certain wavelength. The blazed wavelength of the inner region 11 can be set at various values. The blazed wavelength may be intermediate values between the wavelengths of the laser beams of the light sources 30A and 30B.

Both of the laser beams from the light sources 30A and 30B incident on the inner region 11 are properly converged on the respective data recording layers of the optical discs 20A and 20B. That is, each of the laser beam for the optical disc 20A and the laser beam for the optical disc 20B incident on the inner region contributes to formation of the beam spot.

The diffracting structure within the outer region 12 of the first lens surface 10a has a plurality of annular steps C1, C2, C3 . . . Cn (n: natural number). The zones C1, C2, C3 . . . Cn are aspherical surfaces which are different from one another and which are defined by different aspherical coefficients.

The diffraction structure within the outer region 12 properly converges the leaser beam for the disc 20B on the data recording layer of the disc 20B, while diffusing the laser beam for the disc 20A. That is, the laser beam for the disc 20B incident on the outer region 12 contributes to the formation of the beam spot, while the laser beam for the disc 20A incident on the outer region 12 does not contribute to the formation of the beam spot.

More specifically, the outer region 12 is configured such that a wavefront of the laser beam from the light source 30B passed through the outer region 12 and the intermediate region 13 substantially coincides with a wavefront of the laser beam from the light source 30B passed through the inner region 11.

With the above mentioned configuration, the laser beam from the light source 30A passing through only the inner region 11 forms the beam spot having relatively large diameter suited for the disc 20A, while the laser beam from the light source 30B passing through the inner region 11, intermediate region 13 and outer region 12 forms the beam spot having relatively small diameter suited for the disc 20B.

The laser beam from the light source 30A diffused by the outer region 12 appears as flare light on the data recording layer of the disc 20A.

The laser beam for the disc 20A reflected from the data recording layer of the disc 20A passes through the objective lens 10, the collimator lens 50 and the half mirror 40 in that order, and is thereafter incident on a first receiving portion 60A of the light detecting unit 60.

Figure 3:
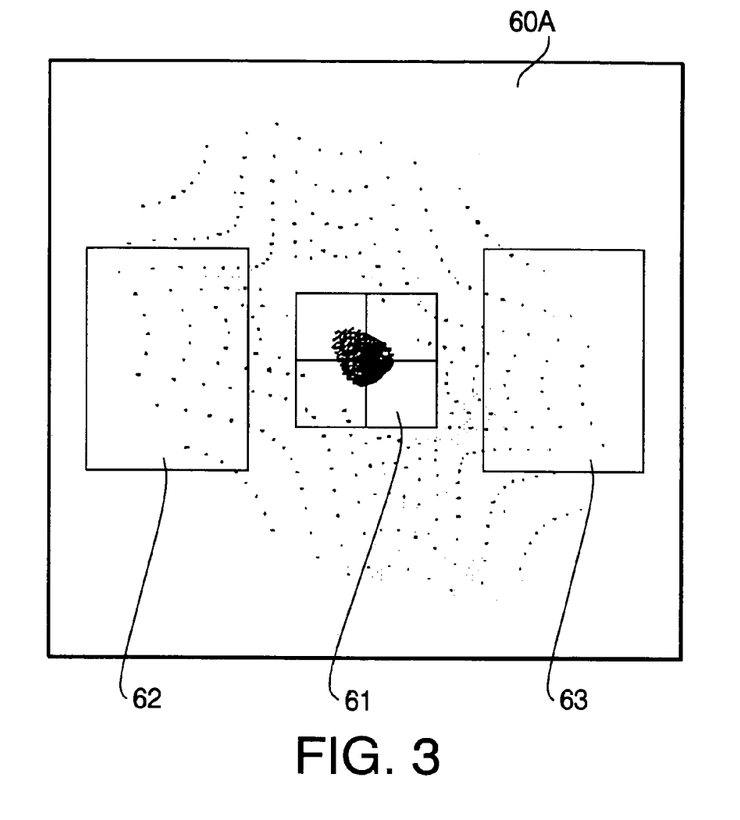
FIG. 3 is a spot diagram of light on a surface of a first receiving portion when it is viewed from an objective lens side.

FIG. 3 is a spot diagram of light (i.e., the laser beam for the disc 20A) on a surface of the first receiving portion 60A when it is viewed from an objective lens side. As shown in FIG. 3, the first receiving portion 60A has a main sensor 61 and sub-sensors 62 and 63 which are located on the both sides of the main sensor 61.

As shown in FIG. 3, the laser beam contributing to the formation of the beam spot on the disc 20A passes through again the inner region 11 of the objective lens as high intensity light, and is then incident on the main sensor 61 of the first receiving unit 60A. On the other hand, the flare light (i.e., the light diffused on the data recording layer of the disc 20A after passing through the outer region 12 and the intermediate region 13) passes through the inner region 11, the intermediate region 13 and the outer region 12, and is then incident on the sub-sensor 62 and 63.

Spots densely gathered within the main sensor 61 represent the high intensity light. Spots scattered on the periphery of the densely gathered spots represent the flare light reflected from the disc 20A.

The main sensor 61 of the first portion 60A receives light (the high intensity light) modulated by recorded information of the disc 20A. Then, the FE signal is generated by the first receiving portion 60A in accordance with, for example, the astigmatic method.

Actually, a portion of the laser beam is divided into two sub-beams (not shown) that are reflected by the disc 20A and are incident on the sub-sensors 62 and 63. By using the sub-beams incident on the sub-sensors 62 and 63, the TE signal is generated in accordance with the three beam method.

Meanwhile, the laser beam for the disc 20B reflected from the disc 20B is incident on a second receiving portion 60B of the light detecting unit 60. The second receiving portion 60B generates the TE signal in accordance with, for example, the push-pull method.

If the objective lens 10 does not have the intermediate region 13 within the outer region 12 (i.e., in the case of a conventional objective lens), the following undesired phenomenon occurs. When the optical disc 20A is tilted, there may be a case where a portion of the high intensity light, which is to be incident on the main sensor 61, passes through the outer region 12 of the objective lens 10 and is thereby incident on the sub-sensors 62 and 63. If such a phenomenon occurs, noise may be caused on the TE signal, which deteriorates accuracy of tracking servo operation.

To prevent occurrence of such a phenomenon, the optical system 100 according to the embodiment is configured as follows. As shown in FIG. 2, on the first surface 10a, the intermediate region 13 is formed. The intermediate region 13 has a plurality of annular zones (S1, S2, S3 . . . ) to have selectivity of wavelength. The selectivity of wavelength means that optical performance changes depending on wavelength of the incident laser beam.

Although in FIG. 2 the intermediate region 13 has three annular zones including S1, S2 and S3, more than or less than three annular zones may be formed within the intermediate region 13 to have the selectivity of wavelength.

As shown in FIG. 2, the intermediate region 13 is formed between an outermost side 11a of the inner region 11 and an innermost side 12a of the zones C1, C2, C3 . . . Cn.

The intermediate region 13 is configured to satisfy a condition (1):

$$0.0035 < \{W \cdot (\phi_2/\phi_1)\}/\{(1-M) \cdot f\} < 0.0350 \quad (1)$$

where W (mm) represents a width of the intermediate region 13 when the intermediate region 13 is projected onto a plane perpendicular to the reference axis of the optical system 100 (i.e., the optical axis of the objective lens 10), f (mm) represents a focal length of the objective lens 10 for the wavelength of the laser beam for the disc 20A, M represents a magnification of the objective lens 10 when the disc 20A is used, $\phi_1$ (mm) represents a diameter of the inner region 11, and $\phi_2$ (mm) represents a diameter of the laser beam for the disc 20A incident on the inner region 11 when the diameter $\phi_2$ is measured on the light source side lens surface of the objective lens 10.

When an optical configuration (i.e., the diffracting structure) to satisfy compatibility between the disc 20A and the disc 20B is formed on the first surface 10a, $\phi_1 = \phi_2$ holds. In this case, the condition is changed to the following condition (2).

$$0.0035 < W/\{(1-M) \cdot f\} < 0.0350 \quad (2)$$

When $\{W(\phi_2/\phi_1)\}/\{(1-M)f\}$ or $W/\{(1-M)f\}$ gets larger than the upper limit of the condition (1) or condition (2), the width of the intermediate region 13 becomes too large. In this case, optical performance of the objective lens 10 for the disc 20B, for example, optical performance for wavelength deviation of light may be deteriorated.

When $\{W(\phi_2/\phi_1)\}/\{(1-M)f\}$ or $W/\{(1-M)f\}$ gets smaller than the lower limit of the condition (1) or condition (2), the width of the intermediate region 13 becomes too small. In this case, the effectiveness of the objective lens 10 for reducing noise on the TE signal may decrease.

The diffracting structure formed within the intermediate region 13 has functions of diffusing the laser beam from the light source 30A (for the disc 20A) by interference and hardly diffusing the laser beam from the light source 30B (for the disc 20B).

More specifically, each step between adjacent annular zones within the intermediate region 13 generates an optical path length difference whose absolute value is about (N+0.5) times (N: natural number) as large as the wavelength of the laser beam from the light source 30A. Consequently, the laser beam for the disc 30A is diffused sufficiently by the intermediate region 13, which prevents the above mentioned high intensity light from being incident on the sub-sensors 62 and 63 of the first receiving portion 60A.

By contrast, with regard to the laser beam from the light source 30B (for the disc 20B), each step between adjacent annular zones within the intermediate region 13 generates an optical path length difference whose absolute value is nearly equal to integral multiple of the wavelength of the laser beam Consequently, the laser beam for the disc 20B is hardly diffused by the intermediate region 13 and passes through the objective lens 10.

Generally, a lens having a diffracting structure is formed by injection molding which uses a mold having a structure corresponding to the diffracting structure. One of the problems of manufacturing process of the injection molding using the mold is that each protruded surface in the annular zones is formed less accurately than each recessed surface in the annular zones.

To avoid such a problem, the annular zones of the intermediate region 13 are configured such that each protruded surface is larger than each recessed surface. As a result, a manufacturing error in the intermediate region 13 is reduced. The difference between each protruded surface and each recessed surface may be determined depending on an amount of such manufacturing error. For example, in examples explained below, each protruded surface is 20% larger than each recessed surface.

Hereafter, two concrete examples according to the embodiment of the invention are described. In each example, the disc 20A is a writable disc and has the thickness of the cover layer of 1.2 mm. The disc 20B has the thickness of the cover layer of 0.6 mm. The objective lens 10 is a so-called compatible lens supporting the disc 20A and the disc 20B. Reference numbers used in FIGS. 1-3 are also used in the following explanation.

FIRST EXAMPLE

Table 1 shows a numerical configuration of the objective lens 10 according to a first example. Table 2 shows a numerical configuration of the optical system 100 according to the first example.

TABLE 1

|  | 20A | 20B |
| --- | --- | --- |
| M | −0.0009 | 0.0000 |
| f (mm) | 3.02 | 3.00 |
| Design wavelength (nm) | 785 | 660 |
| NA | 0.53 | 0.65 |

In Table 1, M and f represent the magnification and the focal length of the objective lens 10, respectively. The design wavelength means that a wavelength of light suitable for the recordation/reproduction for the disc 20A and the disc 20B. In this example, the design wavelength for the disc 20A is 785 nm, and the design wavelength for the disc 20B is 660 nm. The NA means a numerical aperture on an image side.

TABLE 2

| No. | r | d 20A | d 20B | n | ν | h |
| --- | --- | --- | --- | --- | --- | --- |
| #0 |  | 19.99 |  |  |  |  |
| #1 | 40.00000 | 2.00 |  | 1.492 | 57.4 |  |
| #2 | −13.60000 | 7.36 | 7.00 |  |  |  |
| #3 | 1.87400 | 2.00 |  | 1.544 | 55.7 | 0~1.600 |
|  | 1.88176 |  |  |  |  | ~1.610 |
|  | 1.88253 |  |  |  |  | ~1.622 |
|  | 1.88176 |  |  |  |  | ~1.632 |
|  | 1.88300 |  |  |  |  | ~1.702 |
|  | 1.88429 |  |  |  |  | ~1.761 |
|  | 1.88558 |  |  |  |  | ~1.816 |
|  | 1.88686 |  |  |  |  | ~1.866 |
|  | 1.88815 |  |  |  |  | ~1.914 |
|  | 1.88943 |  |  |  |  | ~1.950 |
| #4 | −7.53000 | 1.14 | 1.50 |  |  |  |
| #5 |  | 1.20 | 0.60 | 1.585 | 29.9 |  |
| #6 |  | — | — |  |  |  |

In Table 2, r denotes a radius of curvature (mm) of each lens surface, d denotes a thickness of a lens or an interval between lenses (i.e., d denotes a distance from a lens surface to a next lens surface), n denotes a refractive index at d-ray (588 nm), ν denotes an Abbe number at the d-ray, and h denotes a height from the optical axis. In Table 2, the distance "d" changes between use of the disc 20A and use of the disc 20B because a working distance from a disc surface of the disc to the objective lens 10 changes depending on the type of the optical disc being used.

In Table 2, the surface number #0-#6 represent optical surfaces of optical components in the optical system 100. The surface #0 represents the light source, and the surfaces #1 and #2 respectively represent a light source side surface and an objective lens side of the collimator lens 50. The surfaces #3 and #4 respectively represent the first surface 10a and the second surface 10b of the objective lens 10. The surface #5 represents the cover layer of the disc, and the surface #6 represents the data recording layer of the disc.

In the first example, the objective lens 10 has the inner region 11, the intermediate region 13 and the outer region 12. The intermediate region 13 has three annular zones S1~S3. The outer region 12 has six annular zones C1~C6.

In Table 2, a detailed configuration of the diffracting structure in each of the inner region 11, the intermediate region 13 and the outer region 12 is indicated. A range of height h=0~1.600 represents the inner region 11, a range of height h=1.600~1.610 represents the annular zone S1, a range of height h=1.610~1.622 represents the annular zone S2, a range of height h=1.622~1.632 represents the annular zone S3, a range of height h=1.632~1.702 represents the annular zone C1, a range of height h=1.702~1.761 represents the annular zone C2, a range of height h=1.761~1.816 represents the annular zone C3, a range of height h=1.816~1.866 represents the annular zone C4, a range of height h=1.866~1.914 represents the annular zone C5, and a range of height h=1.914~1.950 represents the annular zone C6.

The surfaces #1 and #2 of the collimator lens 50 are spherical surfaces. The first surface 10a (#3) and the second surface 10b (#4) of the objective lens 10 are aspherical surfaces.

The aspherical surface is expressed by a following equation:

$$X(h) = \frac{Ch^2}{1+\sqrt{1-(1+\kappa)C^2h^2}} + A_4h^4 + A_6h^6 + A_8h^8 + A_{10}h^{10} + A_{12}h^{12}$$

where X(h) represents a SAG amount which is a distance between a point on the aspherical surface at a height of h from the optical axis and a plane tangential to the aspherical surface at the optical axis. κ represents a conical coefficient, and $A_4$, $A_6$, $A_8$, $A_{10}$ and $A_{12}$ are aspherical coefficients of $4^{th}$, $6^{th}$, $8^{th}$ $10^{th}$ and $12^{th}$ orders, respectively. C is curvature of the aspherical surface on its optical axis.

Table 3 shows aspherical coefficients and the conical coefficient of the surfaces #1 and #2 of the collimator lens 50, and the first surface 10a (#3) and the second surface 10b (#4) of the objective lens 10.

TABLE 3

| Surface | κ | d_shift | A4 | A6 | A8 | A10 | A12 |
|---|---|---|---|---|---|---|---|
| #1 | 0.0000 | | 0.00000E+00 | 0.00000E+00 | 0.00000E+00 | 0.00000E+00 | 0.00000E+00 |
| #2 | −0.5000 | | 3.70000E−05 | 0.00000E+00 | 0.00000E+00 | 0.00000E+00 | 0.00000E+00 |
| Inner region 11 | −0.6050 | | −8.65100E−04 | −3.68600E−04 | −2.93600E−05 | −1.55600E−05 | −2.64200E−06 |
| S1 | −0.6050 | −0.02210 | 1.80754E−03 | 4.97362E−04 | −1.61908E−04 | 3.75585E−05 | −8.22877E−06 |
| S2 | −0.6050 | −0.02431 | 1.80677E−03 | 4.95531E−04 | −1.61154E−04 | 3.74092E−05 | −8.19538E−06 |
| S3 | −0.6050 | −0.02210 | 1.80754E−03 | 4.97362E−04 | −1.61908E−04 | 3.75585E−05 | −8.22877E−06 |
| C1 | −0.6050 | −0.02565 | 2.32192E−03 | 3.05715E−04 | −7.33631E−05 | 2.01569E−05 | −6.92069E−06 |
| C2 | −0.6050 | −0.02931 | 2.31800E−03 | 3.05000E−04 | −7.31600E−05 | 2.01200E−05 | −6.88100E−06 |
| C3 | −0.6050 | −0.03297 | 2.31408E−03 | 3.04285E−04 | −7.29569E−05 | 2.00831E−05 | −6.84131E−06 |
| C4 | −0.6050 | −0.03664 | 2.31015E−03 | 3.03569E−04 | −7.27538E−05 | 2.00462E−05 | −6.80162E−06 |
| C5 | −0.6050 | −0.04030 | 2.30623E−03 | 3.02854E−04 | −7.25508E−05 | 2.00092E−05 | −6.76192E−06 |
| C6 | −0.6050 | −0.04396 | 2.30231E−03 | 3.02138E−04 | −7.23477E−05 | 1.99723E−05 | −6.72223E−06 |
| #4 | 0.0000 | | 2.31800E−02 | −7.77000E−03 | 1.58700E−03 | −1.93700E−04 | 1.05400E−05 |

As shown in Table 3, all of the annular zones S1, S2, S3, C1, C2, C3, C4, C5 and C6 have different aspherical surface forms. As shown in FIG. 2, when intersection points between the optical axis and extensions of the annular zones on the first surface 10a are represented by P1, P2, P3 . . . , d_shift in Table 3 represents a distance from a point P0, which is an intersection point between the optical axis and the first surface 10a, to each of the intersection points P1, P2, P3 . . . .

In Table 3, values are indicated by a number system with a radix E=10 and an exponent on the right side of the radix E. The diffracting structure within the intermediate region 13 and the outer region 12 are defined by Tables 2 and 3. With regard to the laser beam for the disc 20A, a ratio of the transmissivity of the intermediate region 13 to the transmissivity of the inner region 11 is 0.4%.

The diffracting structure within the inner region 11 is defined by an optical path difference function Φ(h) which is expressed by:

$$\Phi(h) = (P_2 h^2 + P_4 h^4 + P_6 h^6 + \ldots) \times m \times \lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure.

Table 4 shows values of the coefficients of the optical path difference function Φ(h) applied to the inner region 11 of the first surface 10a of the objective lens 10. In this embodiment, m is 1.

TABLE 4

| | Inner region |
|---|---|
| P2 | 0.000 |
| P4 | −2.666 |
| P6 | −0.344 |
| P8 | 0.000 |

Table 5 shows optical path differences between adjacent annular zones in the inner region 11, optical path differences between adjacent annular zones in the intermediate region 13, and optical path differences between adjacent annular zones in the outer region 12 for each of the laser beams from the light sources 20A and 20B. That is, with regard to adjacent two annular zones in the diffracting structure, each value in Table 5 represents an optical path length added by the outer annular zone with respect to an optical path length in the inner annular zone.

TABLE 5

| | Optical path difference | |
|---|---|---|
| | 20A | 20B |
| Inner region 11 | −0.914 | −1.095 |
| S1 | 5.917 | 7.087 |
| S2 | −1.511 | −1.810 |
| S3 | 1.511 | 1.810 |
| C1 | −2.424 | −2.903 |
| C2 | −2.505 | −3.000 |
| C3 | −2.505 | −3.000 |
| C4 | −2.505 | −3.000 |
| C5 | −2.505 | −3.000 |
| C6 | −2.505 | −3.000 |

As shown in Table 5, the intermediate region 13 is configured such that the optical path difference for the laser beam from the light source 30A caused by each of the annular zones is 1.5 times as large as the wavelength of the laser beam from the light source 30A. That is, when the scaling of 1.5 is expressed by N+0.5, N is 1. With this structure, a strong effect of diffusing the laser beam from the light source 30A is attained.

Also, by setting the optical path difference to 1.5 times as large as the wavelength of the laser beam from the light source 30A, the d_shift of each of the annular zones can be decreased.

As shown in Table 2, the width of each of annular zones within the intermediate region 13 is 0.010 mm or 0.012 mm. Therefore, even though the size of the entire intermediate region 13 is relatively small, the sufficient effect of interference is attained by the intermediate region 13 because the laser beam is distributed over the plurality of annular zones in the intermediate region 13.

In this example, the an optical configuration (i.e., the diffracting structure) to satisfy compatibility between the disc 20A and the disc 20B is formed on the first surface 10a. Further, the width W of the intermediate region 13 is 0.032 mm (W=0.032 mm), the focal length f for the wavelength for the disc 20A is 3.02 mm (f=3.02 mm), the magnification of the objective lens 10 for the disc 20A is −0.0009 (M=−0.0009). In this case, $W/\{(1-M)f\}$ is 0.0106, and therefore the first example satisfies the condition (2).

By using the objective lens 10 according to the first example, even if a relatively small tilting of the disc 20A with respect to the plane perpendicular to the optical axis occurs, a portion of the above mentioned high intensity light, which does not pass through the inner region 11, can be sufficiently diffused because the portion of the high intensity light does not pass through the outer region 12, but the intermediate region 13.

Therefore, according to the first example, it becomes possible to prevent the portion of the high intensity light from being incident on the sub-sensors 62 and 63 of the first receiving portion 60A. Consequently, the noise level on the TE signal caused when the disc 20A is used can be sufficiently suppressed.

Figure 4:
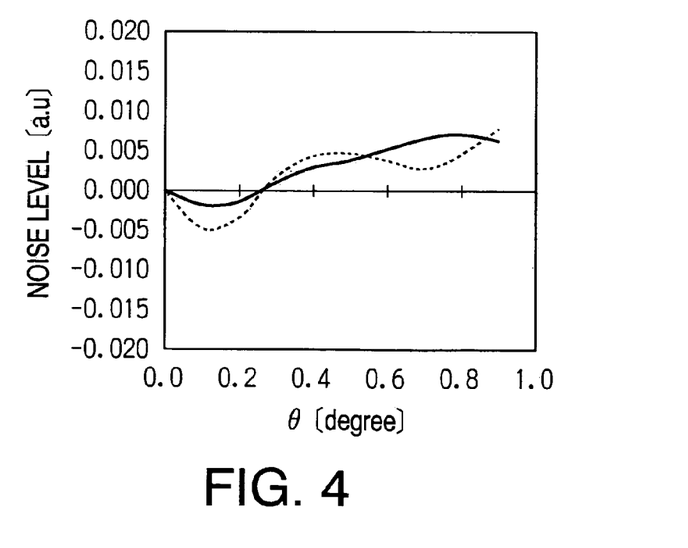
FIG. 4 is a graph showing a relationship between a tilt angle of a disc with respect to a plane perpendicular to the optical axis and a noise level on a TE signal in the optical system according to a first example.

FIG. 4 is a graph showing a relationship between the tilt angle θ of the disc 20A with respect to the plane perpendicular to the optical axis and a noise level on the TE signal. In FIG. 4, a curve indicated by a solid line represents the relationship when the objective lens 10 according to the first example is used. For comparison, the relationship when a conventional objective lens is used is also shown in FIG. 4 as a curve indicated by a dashed line.

As can be seen from FIG. 4, by using the objective lens 10 according to the first embodiment, the noise level on the TE signal can be reduced in comparison with the conventional objective lens when the tilt angle θ takes a value ranging from 0° to about 0.5° (i.e., 0°<θ<about 0.5°).

As shown in Table 5, the intermediate region 13 generates optical path differences, each of which is substantially equal to an integral multiple of the wavelength of the laser beam from the light source 30B. Therefore, the laser beam from the light source 30B is not diffused by the intermediate region 13, and passes through the intermediate region 13 to contribute to the formation of the beam spot on the disc 20B.

SECOND EXAMPLE

Table 6 shows a numerical configuration of the objective lens 10 according to a second example. Table 7 shows a numerical configuration of the optical system 100 according to the second example.

TABLE 6

|  | 20A | 20B |
|---|---|---|
| M | −0.0009 | 0.0000 |
| f (mm) | 2.52 | 2.50 |
| Design wavelength (nm) | 790 | 655 |
| NA | 0.48 | 0.60 |

Symbols in Table 6 have the same meanings as those shown Table 1. In this example, the design wavelength for the disc 20A is 790 nm, and the design wavelength for the disc 20B is 655 nm.

TABLE 7

| No. | r | d 20A | d 20B | n | ν | h |
|---|---|---|---|---|---|---|
| #0 |  | 16.61 |  |  |  |  |
| #1 | 30.00000 | 2.00 |  | 1.492 |  | 57.4 |
| #2 | −11.80000 | 7.36 | 7.00 |  |  |  |
| #3 | 1.55400 | 1.40 | 1.544 | 55.7 |  | 0~1.200 |
|  | 1.56412 |  |  |  |  | ~1.209 |
|  | 1.56540 |  |  |  |  | ~1.220 |
|  | 1.56412 |  |  |  |  | ~1.229 |
|  | 1.56540 |  |  |  |  | ~1.240 |
|  | 1.56412 |  |  |  |  | ~1.249 |
|  | 1.56540 |  |  |  |  | ~1.260 |
|  | 1.56412 |  |  |  |  | ~1.269 |
|  | 1.56540 |  |  |  |  | ~1.326 |
|  | 1.56668 |  |  |  |  | ~1.390 |
|  | 1.56795 |  |  |  |  | ~1.445 |
|  | 1.56923 |  |  |  |  | ~1.500 |
| #4 | −6.94000 | 0.97 | 1.33 |  |  |  |
| #5 |  | 1.20 | 0.60 | 1.585 | 29.9 |  |
| #6 |  | — | — |  |  |  |

Symbols in Table 7 have the same meanings as those shown Table 2. In the second example, the objective lens 10 has the inner region 11, the intermediate region 13 and the outer region 12. The outer region 12 has four annular zones C1~C4. The intermediate region 13 has seven annular zones S1~S7.

In Table 7, a detailed configuration of the diffracting structure in each of the inner region 11, the intermediate region 13 and the outer region 12 is indicated. A range of height h=0~1.200 represents the inner region 11. A range of height h=1.200~1.209 represents the annular zone S1, a range of height h=1.209~1.220 represents the annular zone S2, a range of height h=1.220~1.229 represents the annular zone S3, and a range of height h=1.229~1.240 represents the annular zone S4. A range of height h=1.240~1.249 represents the annular zone S5, a range of height h=1.249~1.260 represents the annular zone S6, and a range of height h=1.260~1.269 represents the annular zone S7. A range of height h=1.269~1.326 represents the annular zone C1, a range of height h=1.326~1.390 represents the annular zone C2, a range of height h=1.390~1.445 represents the annular zone C3, and a range of height h=1.445~1.500 represents the annular zone C4.

In the second example, the surfaces #1 and #2 of the collimator lens 50, and the first and second surfaces 10a (#3) and 10b (#4) of the objective lens 10 are aspherical surfaces.

Table 8 shows aspherical coefficients and the conical coefficient of the surfaces #1 and #2 of the collimator lens 50, and the first surface 10a (#3) and the second surface 10b (#4) of the objective lens 10.

TABLE 8

| Surface | κ | d_shift | A4 | A6 | A8 | A10 | A12 |
|---|---|---|---|---|---|---|---|
| #1 | 0.0000 |  | 0.00000E+00 | 0.00000E+00 | 0.00000E+00 | 0.00000E+00 | 0.00000E+00 |
| #2 | −0.5000 |  | 7.00000E−05 | 0.00000E+00 | 0.00000E+00 | 0.00000E+00 | 0.00000E+00 |

TABLE 8-continued

| Surface | κ | d_shift | A4 | A6 | A8 | A10 | A12 |
|---|---|---|---|---|---|---|---|
| Inner region 11 | −0.5000 | | −4.89100E−03 | −1.95300E−03 | −1.25000E−04 | −3.20000E−04 | 0.00000E+00 |
| S1 | −0.5000 | −0.01212 | 1.44792E−03 | −5.77865E−04 | 1.88178E−04 | −3.08400E−04 | −1.35738E−05 |
| S2 | −0.5000 | −0.01575 | 1.44515E−03 | −5.73951E−04 | 1.86233E−04 | −3.05400E−04 | −1.36223E−05 |
| S3 | −0.5000 | −0.01212 | 1.44792E−03 | −5.77865E−04 | 1.88178E−04 | −3.08400E−04 | −1.35738E−05 |
| S4 | −0.5000 | −0.01575 | 1.44515E−03 | −5.73951E−04 | 1.86233E−04 | −3.05400E−04 | −1.36223E−05 |
| S5 | −0.5000 | −0.01212 | 1.44792E−03 | −5.77865E−04 | 1.88178E−04 | −3.08400E−04 | −1.35738E−05 |
| S6 | −0.5000 | −0.01575 | 1.44515E−03 | −5.73951E−04 | 1.86233E−04 | −3.05400E−04 | −1.36223E−05 |
| S7 | −0.5000 | −0.01212 | 1.44792E−03 | −5.77865E−04 | 1.88178E−04 | −3.08400E−04 | −1.35738E−05 |
| C1 | −0.5000 | −0.01575 | 1.44515E−03 | −5.73951E−04 | 1.86233E−04 | −3.05400E−04 | −1.36223E−05 |
| C2 | −0.5000 | −0.01938 | 1.44238E−03 | −5.70037E−04 | 1.84288E−04 | −3.02400E−04 | −1.36708E−05 |
| C3 | −0.5000 | −0.02302 | 1.43962E−03 | −5.66123E−04 | 1.82342E−04 | −2.99400E−04 | −1.37192E−05 |
| C4 | −0.5000 | −0.02665 | 1.43685E−03 | −5.62209E−04 | 1.80397E−04 | −2.96400E−04 | −1.37677E−05 |
| #4 | 0.0000 | | 3.35000E−02 | −1.64000E−02 | 3.96000E−03 | −4.13000E−04 | 0.00000E+00 |

As shown in Table 8, all of the annular zones S1, S2, S3, S4, S5, S6, S7, C1, C2, C3 and C4 have different aspherical surface forms. The diffracting structure in the intermediate region 13 and the outer region 12 is represented by the height H in Table 7 and d_shift in Table 8. With regard to the laser beam for the disc 20A, the ratio of the transmissivity of the intermediate region 13 to the transmissivity of the inner region 11 is 6.8%.

Table 9 shows values of the coefficients of the optical path difference function Φ(h) applied to the inner region 11 of the first surface 10a of the objective lens 10.

TABLE 9

| | Inner region |
|---|---|
| P2 | 1.000 |
| P4 | −5.090 |
| P6 | −0.920 |
| PB | 0.000 |

Table 10 shows optical path differences between adjacent annular zones in the inner region 11, optical path differences between adjacent annular zones in the intermediate region 13, and optical path differences between adjacent annular zones in the outer region 12 for each of the laser beams from the light sources 20A and 20B. That is, with regard to adjacent two annular zones in the diffracting structure, each value in Table 10 represents an optical path length added by the outer annular zone with respect to an optical path length in the inner annular zone.

TABLE 10

| | Optical path difference | |
|---|---|---|
| | 20A | 20B |
| Inner region 11 | −0.907 | −1.104 |
| S1 | 2.665 | 3.245 |
| S2 | −2.464 | −3.000 |
| S3 | 2.464 | 3.000 |
| S4 | −2.464 | −3.000 |
| S5 | 2.464 | 3.000 |
| S6 | −2.464 | −3.000 |
| S7 | 2.464 | 3.000 |
| C1 | −2.464 | −3.000 |
| C2 | −2.464 | −3.000 |
| C3 | −2.464 | −3.000 |
| C4 | −2.464 | −3.000 |

As shown in Table 10, the intermediate region 13 is configured such that the optical path difference for the laser beam from the light source 30A caused by each of the annular zones is 2.5 times as large as the wavelength of the laser beam from the light source 30A. That is, when the scaling of 2.5 is expressed by N+0.5, N is 2. With this structure, a strong effect of diffusing the laser beam from the light source 30A is attained.

As shown in Table 7, the width of each of annular zones within the intermediate region 13 is 0.009 mm or 0.010 mm. Therefore, even though the size of the entire intermediate region 13 is relatively small, the sufficient effect of interference is attained by the intermediate region 13 because the laser beam is distributed over the plurality of annular zones in the intermediate region 13.

In this example, the an optical configuration (i.e., the diffracting structure) to satisfy compatibility between the disc 20A and the disc 20B is formed on the first surface 10a. Further, the width W of the intermediate region 13 is 0.069 mm (W=0.069 mm), the focal length f for the wavelength for the disc 20A is 2.52 mm (f=2.52 mm), the magnification of the objective lens 10 for the disc 20A is −0.0009 (M= −0.0009). In this case, W/{(1−M)f} is 0.0274, and therefore the second example satisfies the condition (2).

By using the objective lens 10 according to the second example, even if a relatively small tilting of the disc 20A with respect to the plane perpendicular to the optical axis occurs, a portion of the above mentioned high intensity light, which does not pass through the inner region 11, can be sufficiently diffused because the portion of the high intensity light does not pass through the outer region 12, but the intermediate region 13.

Therefore, according to the second example, it becomes possible to prevent the portion of the high intensity light from being incident on the sub-sensors 62 and 63 of the first receiving portion 60A. Consequently, the noise level on the TE signal caused when the disc 20A is used can be sufficiently suppressed.

Figure 5:
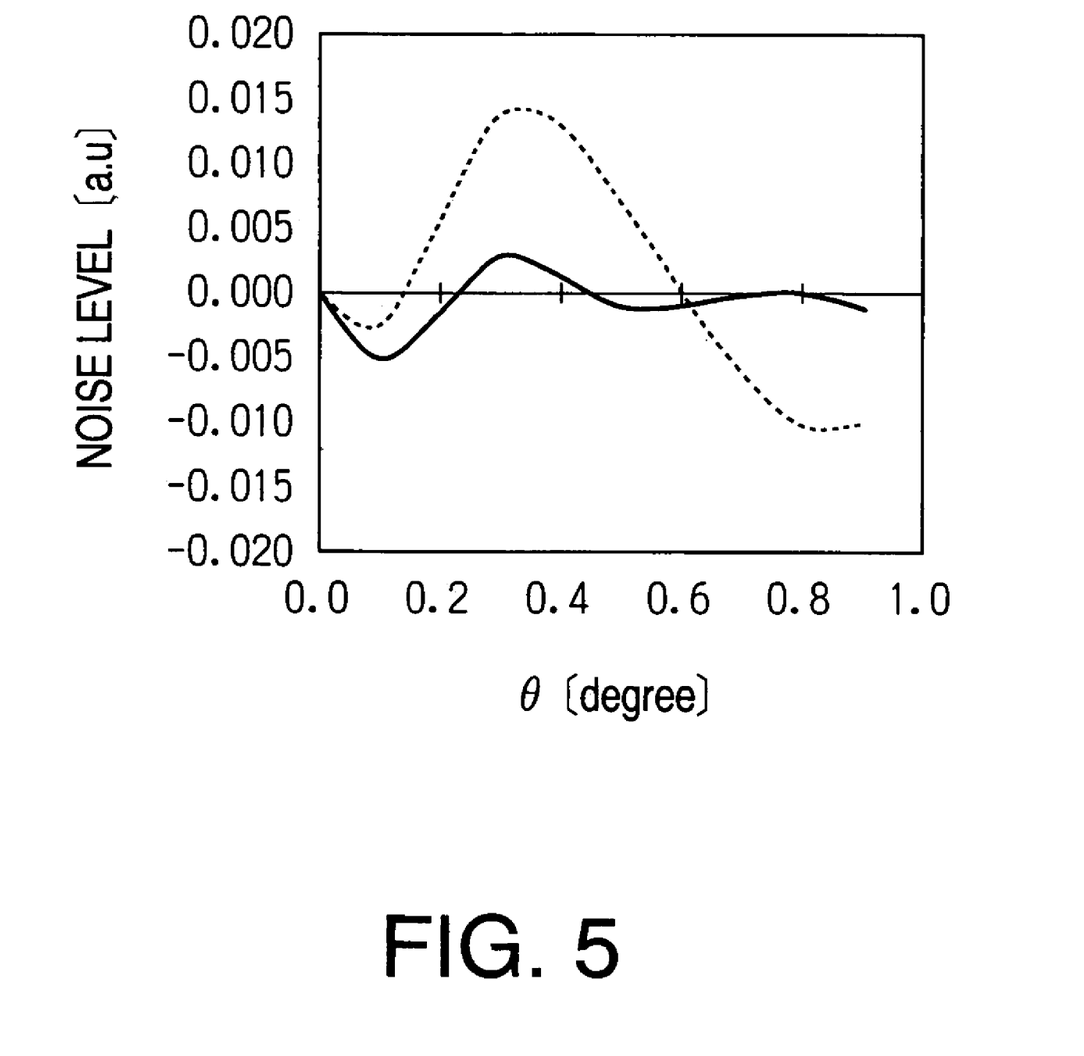
FIG. 5 is a graph showing a relationship between a tilt angle of a disc with respect to a plane perpendicular to the optical axis and a noise level on the TE signal in the optical system according to a second example.

FIG. 5 is a graph showing a relationship between the tilt angle θ of the disc 20A with respect to the plane perpendicular to the optical axis and a noise level on the TE signal. In FIG. 5, a curve indicated by a solid line represents the relationship when the objective lens 10 according to the second example is used. For comparison, the relationship when a conventional objective lens is used is also shown in FIG. 5 as a curve indicated by a dashed line.

As can be seen from FIG. 5, by using the objective lens 10 according to the second embodiment, the noise level on the TE signal can be sufficiently reduced in comparison with the conventional objective lens.

As shown in Table 10, the intermediate region 13 generates optical path differences, each of which is substantially equal to an integral multiple of the wavelength of the laser beam from the light source 30B. Therefore, the laser beam from the light source 30B is not diffused by the intermediate region 13, and passes through the intermediate region 13 to contribute to the formation of the beam spot on the disc 20B.

As described above, according to the embodiment of the invention, the occurrence of the undesired light caused when an optical disc having relatively low recording density is tilted with respect a proper position is effectively suppressed. Consequently, the noise level on the TE signal caused when the disc having relatively low recording density is used can be sufficiently suppressed.

Although the present invention has been described in considerable detail with reference to certain preferred embodiments thereof, other embodiments are possible.

For example, in the above mentioned embodiment the optical configuration (i.e., the diffracting structure) to satisfy compatibility between the disc 20A and the disc 20B is formed on the first surface 10a of the objective lens 10. The optical configuration to satisfy the compatibility may be formed on the second surface 10b of the objective lens 10.

Alternatively, the optical configuration to satisfy the compatibility may be formed on one of surfaces of the collimator lens 50. Alternatively, the optical configuration to satisfy the compatibility may be formed on a separate optical element provided in the optical system.

Values of the optical parameters including the focal length, design wavelength and NA are indicated in the above mentioned embodiment by way of example. Other values of the optical parameters may alternatively be used without departing from the spirit and scope of the invention.

For example, the objective may be configured to have a relatively high numerical aperture of 0.50 or more for the use of the writable disc 20A. Also, the objective may be configured to have a relatively high numerical aperture of 0.62 or more for the use of the disc 20B.

In the embodiment, the diffracting structure is directly formed on the first surface 10a of the objective lens 10. However, another configuration is possible. For example, a region of an objective lens corresponding to the intermediate region of the embodiment may be covered with an optical coating that has the same function (i.e., the selectivity of wavelength) as the above mentioned diffracting structure in the intermediate region 13.

The present disclosure relates to the subject matter contained in Japanese Patent Application No. P2003-122035, filed on Apr. 25, 2003, which is expressly incorporated herein by reference in its entirety.

What is claimed is:

1. An optical system of an optical pick-up for recording data to and/or reproducing data from at least two types of optical discs including a first optical disc and a second optical disc whose recording density is higher than that of the first optical disc, comprising:

a light source unit that is capable of emitting at least two light beams having different wavelengths respectively corresponding to the first and second optical discs;

an objective lens that is used for respectively converging the at least two light beams on data recording surfaces of the at least two types of optical discs; and a photo detector that has a main sensor for receiving a main beam of returning light from a disc side, and sub-sensors for receiving sub-beams of the returning light from the disc side, wherein said optical system further comprises an optical surface to satisfy compatibility between the at least two types of optical discs, said optical surface being located between said light source unit and one of the at least two type of optical discs;

wherein said optical surface comprises:

an inner region including an optical axis of said objective lens and satisfying a numerical aperture for the first optical disc;

an outer region located outside said inner region for satisfying a numerical aperture for the second optical disc; and an intermediate region that is located within said outer region at a periphery of the inner region, wherein transmissivity for a light beam having a wavelength suitable for the first optical disc in said intermediate region is lower than that in said inner region, wherein when the first optical disc is tilted by a certain minute angle with respect to a plane perpendicular to the optical axis of said objective lens during reproducing operation of the first optical disc, intensity of a portion of the returning light passed through said intermediate region is reduced on the sub-sensors of said photo detector so that the portion of the returning light does not interfere with photo detection operation of the sub-sensors.

2. The optical system according to claim 1, wherein transmissivity for a light beam having a wavelength suitable for one of the at least two types of optical discs other than the first optical disc in said intermediate region is substantially the same as that of said inner region and said outer region, wherein when the one of the at least two types of optical discs other than the first optical disc is used, the light beam for the one of the at least two types of optical discs other than the first optical disc passed through all of said inner region, said intermediate region and said outer region is utilized.

3. The optical system according to claim 1, wherein the transmissivity for the light beam having the wavelength suitable for the first optical disc in said intermediate region is about half of or less than half of transmissivity for the light beam having the wavelength suitable for the first optical disc in said inner region.

4. An optical system of an optical pick-up for recording data to and/or reproducing data from at least two types of optical discs including a first optical disc and a second optical disc whose recording density is higher than that of the first optical disc, comprising:

a light source unit that is capable of emitting at least two light beams having different wavelengths respectively corresponding to the first and second optical discs;

an objective lens that is used for respectively converging the at least two light beams on data recording surfaces of the at least two types of optical discs; and a photo detector that has a main sensor for receiving a main beam of returning light from a disc side, and sub-sensors for receiving sub-beams of the returning light from the disc side;

wherein said optical system further comprises an optical surface to satisfy compatibility between the at least two types of optical discs, said optical surface being located between said light source unit and one of the at least two types of optical discs;
wherein said optical surface comprises:
an inner region including an optical axis of said objective lens and satisfying a numerical aperture for the first optical disc;
an outer region located outside said inner region for satisfying a numerical aperture for the second optical disc; and
an intermediate region that is located within said outer region at a periphery of the inner region,
wherein said intermediate region has a plurality of minute annular zones for giving optical path differences to an incident beam, an absolute value of each optical path difference generated between adjacent ones of the plurality of minute annular zones is N+0.5 times (N: natural number) as large as the wavelength of the light beam suitable for the first optical disc.

5. The optical system according to claim 4,
wherein when the first optical disc is tilted by a certain minute angle with respect to a plane perpendicular to the optical axis of said objective lens during reproducing operation of the first optical disc, intensity of a portion of the returning light passed through said intermediate region is reduced on the sub-sensors of said photo detector so that the portion of the returning light does not interfere with photo detection operation of the sub-sensors.

6. The optical system according to claim 4, wherein N is smaller than or equal to 5.

7. The optical system according to claim 4,
wherein the each optical path difference generated between adjacent ones of the plurality of minute annular zones is an integral multiple of a wavelength of a light beam for one of the at least two types of optical discs other than the first optical disc, the integral multiple being exclusive of zero,
wherein when the one of the at least two types of optical discs other than the first optical disc is used, the light beam for the one of the at least two types of optical discs other than the first optical disc passed through all of said inner region, said intermediate region and said outer region is utilized.

8. The optical system according to claim 4,
wherein the plurality of minute annular zones has repetition of a pair of zones that give optical path differences whose signs are different from each other.

9. The optical system according to claim 8,
wherein a size of each of protruded surfaces of the plurality of minute annular zones is larger than a size of each of recessed surfaces of the plurality of minute annular zones.

10. The optical system according to claim 4,
wherein a width Wz of each of the plurality of minute annular zones satisfies a condition 0.005 mm$\leq$Wz$\leq$0.020 mm when the plurality of minute annular zones are projected to a plane perpendicular to a reference axis of said optical system.

11. The optical system according to claim 4,
wherein said optical system satisfies a condition:

$$0.0035 < \{W \cdot (\phi_2/\phi_1)\}/\{(1-M) \cdot f\} < 0.0350 \quad (1)$$

where W (mm) represents a width of said intermediate region when the intermediate region is projected onto a plane perpendicular to a reference axis of said optical system, f (mm) represents a focal length of said objective lens for the wavelength of the light beam for the first optical disc, M represents a magnification of said objective lens when the first optical disc is used, $\phi_1$ (mm) represents a diameter of said inner region, and $\phi_2$ (mm) represents a diameter of the light beam incident on said inner region when the diameter $\phi_2$ is measured on a light source side surface of said objective lens.

12. The optical system according to claim 4, wherein said optical surface to satisfy the compatibility is formed on one of surfaces of said objective lens.

13. The optical system according to claim 4, wherein said intermediate region adjoins said inner region.

14. An objective lens used for an optical system of an optical pick-up for recording data to and/or reproducing data from at least two types of optical discs including a first optical disc and a second optical disc whose recording density is higher than that of the first optical disc, one of surfaces of said objective lens comprising:
an inner region including an optical axis of said objective lens and satisfying a numerical aperture for the first optical disc;
an outer region located outside said inner region for satisfying a numerical aperture for the second optical disc; and
an intermediate region that is located within said outer region at a periphery of the inner region,
wherein transmissivity for a light beam having a wavelength suitable for the first optical disc in said intermediate region is lower than that in said inner region,
wherein when the first optical disc is tilted by a certain minute angle with respect to a plane perpendicular to the optical axis of said objective lens during reproducing operation of the first optical disc, a portion of returning light from a disc side is incident on said intermediate region, almost all of the portion of returning light incident on said intermediate region being shielded by said intermediate region.

15. The objective lens according to claim 14,
wherein transmissivity for a light beam having a wavelength suitable for one of the at least two types of optical discs other than the first optical disc in said intermediate region is substantially the same as that of said inner region and said outer region,
wherein when the one of the at least two types of optical discs other than the first optical disc is used, the light beam for the one of the at least two types of optical discs other than the first optical disc passed through all of said inner region, said intermediate region and said outer region is utilized.

16. The objective lens according to claim 14,
wherein the transmissivity for the light beam having the wavelength suitable for the first optical disc in said intermediate region is about half of transmissivity for the light beam having the wavelength suitable for the first optical disc in said inner region.

17. An objective lens used for an optical system of an optical pick-up for recording data to and/or reproducing data from at least two types of optical discs including a first optical disc and a second optical disc whose recording density is higher than that of the first optical disc, one of surfaces of said objective lens comprising:
an inner region including an optical axis of said objective lens and satisfying a numerical aperture for the first optical disc;
an outer region located outside said inner region for satisfying a numerical aperture for the second optical disc; and an intermediate region that is located within said outer region at a periphery of the inner region, wherein said intermediate region has a plurality of minute annular zones for giving optical path differences to an incident beam, an absolute value of each optical path difference generated between adjacent ones of the plurality of minute annular zones being N+0.5 times (N: natural number) as large as the wavelength of the light beam suitable for the first optical disc.

18. The objective lens according to claim 17, wherein when the first optical disc is tilted by a certain minute angle with respect to a plane perpendicular to the optical axis of said objective lens during reproducing operation of the first optical disc, a portion of returning light from a disc side is incident on said intermediate region, the portion of returning light incident on said intermediate region being diffused by said intermediate region by a large amount.

19. The objective lens according to claim 17, wherein N is smaller than or equal to 5.

20. The objective lens according to claim 17, wherein the each optical path difference generated between adjacent ones of the plurality of minute annular zones is an integral multiple of the wavelength of a light beam for one of the at least two types of optical discs other than the first optical disc, the integral multiple being exclusive of zero, wherein when the one of the at least two types of optical discs other than the first optical disc is used, the light beam for the one of the at least two types of optical discs other than the first optical disc passed through all of said inner region, said intermediate region and said outer region is utilized.

21. The objective lens according to claim 17, wherein the plurality of minute annular zones has repetition of a pair of zones that give optical path differences whose signs are different from each other.

22. The objective lens according to claim 21, wherein a size of each of protruded surfaces of the plurality of minute annular zones is larger than a size of each of recessed surfaces of the plurality of minute annular zones.

23. The objective lens according to claim 17, wherein a width Wz of each of the plurality of minute annular zones satisfies 0.005 mm $\leq$ Wz $\leq$ 0.020 mm when the plurality of minute annular zones are projected to a plane perpendicular to the optical axis of said objective lens.

24. The objective lens according to claim 17, wherein said objective lens satisfies a condition:

$$0.0035 < W/\{(1-M) \cdot f\} < 0.0350 \qquad (2)$$

where W (mm) represents a width of said intermediate region when the intermediate region is projected onto a plane perpendicular to the optical axis said objective lens, f (mm) represents a focal length of said objective lens for the wavelength of the light beam for the first optical disc, and M represents a magnification of said objective lens when the first optical disc is used.

25. The objective lens according to claim 17, wherein said intermediate region adjoins said inner region.

* * * * *